United States Patent Office 3,458,693
Patented July 29, 1969

3,458,693
MAGNETIC ANALOG MULTIPLICATION
ELEMENT
Charles A. Rosen, Atherton, Calif., assignor to Stanford Research Institute, Menlo Park, Calif., a corporation of California
Filed Nov. 19, 1965, Ser. No. 508,768
Int. Cl. G06g 7/16
U.S. Cl. 235—194        5 Claims

ABSTRACT OF THE DISCLOSURE

An analog multiplication device comprises a magnetic core having input and output windings. A DC pulse places the core in a desired state of remanence. Two different frequency RF signal sources, having amplitudes desired to be multiplied are also applied to the input windings. The difference frequency output signal has an amplitude which is the analog product of two RF input signals and the level of magnetic remanence.

---

This invention relates to magnetic devices, for performing arithmetical operations, and more particularly to a novel magnetic analog multiplication element.

An object of this invention is the provision of a novel magnetic analog multiplication element.

Another object of the present invention is the provision of a unique arrangement whereby there can be obtained from a magnetic storage core a product of the analog value stored therein together with two RF inputs supplied thereto.

Still another object of the present invention is the provision of a magnetic analog multipler for producing the product of three variables.

These and other objects of the invention are achieved in an arrangement comprising a magnetic core having a substantially square loop hysteresis characteristic. This core can have an analog value stored therein. This is performed by coincidentally energizing the core with a high frequency and a DC current using a separate winding for each. The sense of the storage is determined by the polarity of the DC. The state of magnetic saturation is a function of the duration and amplitude of the DC. Multiplication of the value stored in the core by two other inputs occurs by exciting the core by means of separate windings wtih two separate RF inputs. If one of these RF inputs has a value $a_1 \sin \omega_1 t$ and the other has a value $a_2 \sin \omega_2 t$, then the difference frequency output which is derived from the core via a low pass filter has an amplitude which is proportional to the product of the amplitude $a_1$ and $a_2$ of the two input RF signals and the analog value stored in the core.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
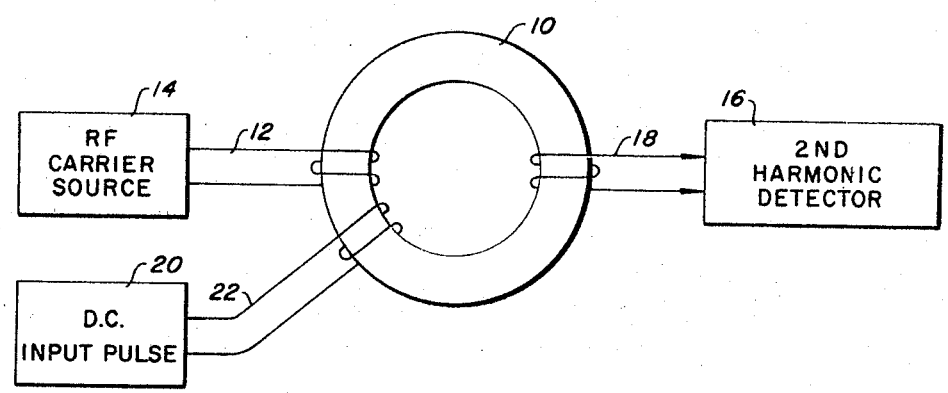
FIGURE 1 is a circuit diagram illustrating structure for affording analog storage in a core in accordance with the prior art, shown for the purpose of assisting in an understanding of this invention.

Referring now to FIGURE 1, it has been found that analog storage in a magnetic core 10 having a substantially square hysteresis loop may be achieved. A first winding 12 is wound on the core and is excited by current from an RF carrier source 14. The frequency of the RF carrier may be, for example, on the order of 100 kilocycles. The amplitude of the excitation by the RF carrier is made insufficient to disturb the hysteresis state of the magnetic core, but should be sufficient to enable an output to be induced in a second harmonic detector 16 which is coupled to the core 10 by means of a winding 18. When it is desired to affect the magnetic state of the core 10, or to store an analog value therein, this is effectuated by applying a direct current pulse from a source 20 to a winding 22 which is inductively coupled on the core 10, simultaneously with the application of the RF excitation.

If the magnetic core 10 is assumed to have a substantially zero state of magnetic saturation, as well as a state of magnetic saturation of positive and negative polarity, then the polarity of the DC pulse determines toward which state of magnetic saturation the core is driven, and the amplitude of this DC pulse determines the amount that the core is driven. Thus, assuming the core is initially in a zero state of magnetic saturation, then a DC pulse of positive polarity would drive the core toward positive magnetic saturation in an amount determined by the amplitude and duration of the current. A negative DC pulse would drive the core toward negative saturation in an amount determined by the amplitude and duration of the negative DC current. If the core is partly saturated in its negative state, then a positive pulse drives the core toward the zero and then on toward the positive state of magnetic saturation. A negative DC pulse in the latter case would drive the core more toward negative magnetic saturation.

The analog storage state of the magnetic core shown in FIGURE 1 is determined by the second harmonic detector 16. The RF carrier applies excitation to the winding 12 when it is desired to sense the storage state of the core. Because of the non-linearity of the magnetic core, there is induced in the winding 18 not only an output at the frequency of excitation but also an output which is the second harmonic of the input frequency. It has been found that the amplitude of this second harmonic is a function of the degree of saturation of the magnetic core. The phase of this second harmonic core relative to the phase when the core is saturated at substantially zero, is an indicator of the polarity of the storage. Accordingly, by detecting the amplitude and phase of the second harmonic output of the core 10, an indication is provided of the analog quantity stored in the core.

Figure 2:
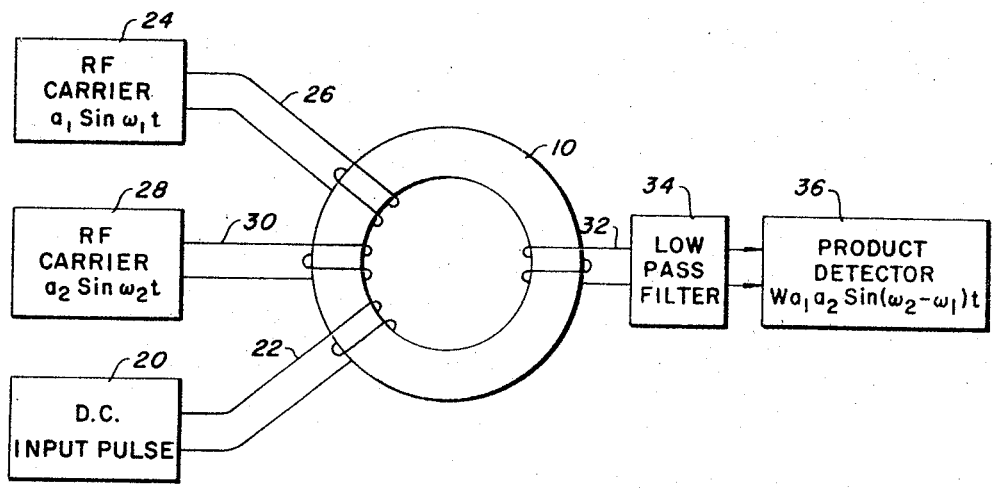
FIGURE 2 is a circuit diagram of an embodiment of this invention.

The arrangement described and shown in FIGURE 1 is known. In accordance with this invention, with the addition of some further structure, one can use the arrangement shown in FIGURE 1 as an analog multiplier. The magnetic core 10 will have a source of DC input pulses 20 which are applied to a winding 22 coupled to the core, for the purpose of storing analog values therein. A source of RF current 24 is employed as before which applies the RF current to the core 10 by means of a coupling winding 26. While the source 24 is one wherein the amplitude of the input signal is varied for effectuating multiplication, for the purpose of altering the storage state of the core 10, this source, at the time of altering the storage state of the core, should always have a fixed amplitude. If it is not desired to do this, then another fixed source of RF may be coupled to the core similar to the RF carrier source 14 shown in FIGURE 1, in addition to the RF carrier source as shown in FIGURE 2.

A second RF current source 28 is coupled to the magnetic core 10 via a winding 30. An output winding 32 is coupled on the core and is thereafter connected to a low pass filter 34. The low pass filter passes the difference of the frequencies of RF carrier 24 and RF carrier 28. The output of the low pass filter 34 is applied to a product detector 36.

The RF carrier sources 24 and 28 may have a fixed frequency for any given multiplication arrangement but the amplitudes of the output signals may be varied. However, the amplitudes of these signals are subject to the same precautions as mentioned previously. These amplitudes should not be so high as to permanently vary the state of magnetic saturation of the core. As previously indicated, the ability to change the storage state of the core is provided by the simultaneous excitation of the core with RF and a DC input pulse.

When it is desired to use the core as a multiplier, then RF is applied thereto from the source 24 and the source 28. The non-linearity of the device causes the RF carriers to beat against one another and to produce harmonics as a result. One of these harmonics is the difference frequency of the two carriers. This is the harmonic which is filtered out via the low pass filter 34 to become the output signal. If, as shown in the drawing, one of the RF carriers is $a_1 \sin \omega_{1t}$ and the other RF carrier is $a_2 \sin \omega_{2t}$, then the product detector will detect the product $W a_1 a_2 \sin (\omega_2 - \omega_1)t$, where $\omega = 2\pi f$, W equals the values stored in the magnetic core, and $a_1$ and $a_2$ indicate the amplitudes of the respective RF carriers 24 and 28.

There has accordingly been described and shown hereinabove a novel, useful and simple magnetic analog multiplier.

What is claimed is:

1. A magnetic analog multiplier comprising a magnetic core having substantially rectangular hysteresis characteristics, means for establishing said magnetic core in a predetermined state of magnetic remanence, a first source of radio frequency signals at a first frequency, a second source of radio frequency signals at a second frequency, first means for inductively coupling said first radio frequency signal source to said core, second means for inductively coupling said second radio frequency source to said magnetic core, an output winding inductively coupled to said magnetic core, and means for detecting a signal in said output winding representative of the product of the amplitudes of said first and second radio frequency signals and the state of magnetic remanence of said magnetic core.

2. A magnetic analog multiplier as recited in claim 1 wherein said means for detecting a signal in said output winding comprises means for deriving the signal having a frequency which is the difference between the frequencies of the first and second radio frequency signals.

3. A magnetic analog multiplier as recited in claim 1 wherein said means for establishing said magnetic core in a predetermined state of magnetic remanence includes a source of direct current pulses and a winding inductively coupling said magnetic core to said source of direct current pulses.

4. A magnetic analog multiplication system as recited in claim 2 wherein said means for deriving a signal having the frequency of the difference between the frequencies of said first and second radio frequency carriers comprises a low pass filter.

5. A method of using a rectangular hystereris magnetic core upon which there are first, second and third input windings and an output winding for analog multiplication comprising;

applying a DC current pulse having a predetermined amplitude to said first input winding to set said core to a desired state of remanence, applying radio frequency current at a first frequency to said second input winding, applying radio frequency current at a second frequency to said third input winding, and detecting an output signal in said output winding having a frequency which is the difference in frequency between said first and second radio frequency currents and an amplitude which represents the product of the amplitude of said DC current and the amplitudes of said first and second radio frequency currents.

References Cited

UNITED STATES PATENTS

| 2,776,373 | 1/1957 | Mischler | 331—42 X |
| 2,958,787 | 11/1960 | Hardenbergh | 235—178 X |
| 3,042,306 | 7/1962 | Geyger | 235—178 |
| 3,239,656 | 3/1966 | Seegmiller | 235—178 |

MALCOLM A. MORRISON, Primary Examiner

J. F. RUGGIERO, Assistant Examiner

U.S. Cl. X.R.

331—43